United States Patent
Cetlur et al.

(10) Patent No.: US 9,998,443 B2
(45) Date of Patent: Jun. 12, 2018

(54) RETROSPECTIVE DISCOVERY OF SHARED CREDENTIALS

(71) Applicant: International Business Machines Corporation, Armonk, NY (US)

(72) Inventors: Aditya S. Cetlur, Singapore (SG); Hung Le, Singapore (SG); Edwin B. Soenaryo, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 146 days.

(21) Appl. No.: 15/049,422

(22) Filed: Feb. 22, 2016

(65) Prior Publication Data
US 2017/0244689 A1    Aug. 24, 2017

(51) Int. Cl.
*H04L 29/06*       (2006.01)
*G06F 21/31*       (2013.01)
*G06F 21/55*       (2013.01)
*G06F 21/56*       (2013.01)

(52) U.S. Cl.
CPC ............ *H04L 63/08* (2013.01); *G06F 21/316* (2013.01); *G06F 21/552* (2013.01); *G06F 21/566* (2013.01); *H04L 63/083* (2013.01); *H04L 63/102* (2013.01); *H04L 63/20* (2013.01)

(58) Field of Classification Search
CPC .... G06F 21/316; G06F 21/552; G06F 21/566; H04L 63/083
See application file for complete search history.

(56) References Cited

U.S. PATENT DOCUMENTS

| | | | |
|---|---|---|---|
| 8,285,658 B1* | 10/2012 | Kellas-Dicks | G06F 21/316 706/20 |
| 8,572,709 B2 | 10/2013 | Hockings et al. | |
| 9,503,451 B1* | 11/2016 | Kane-Parry | H04L 63/083 |
| 9,690,915 B2* | 6/2017 | Turgeman | G06F 21/316 |

(Continued)

OTHER PUBLICATIONS

Detecting people sharing login/account information for a website; Stack Overflow; Feb. 1, 2012; https://stackoverflow.com/questions/9097968/detecting-people-sharing-login-account-information-for-a-website.*

(Continued)

*Primary Examiner* — James R Turchen
(74) *Attorney, Agent, or Firm* — Daniel R. Simek

(57) ABSTRACT

A method for identifying a shared credential within a networked computing environment. The method includes a computer processor accessing information corresponding to an aggregated plurality of authentication events within a networked computing environment. The method further includes identifying one or more credentials that are associated with the aggregated plurality of authentication events. The method further includes analyzing a frequency of usage of a first credential that is included in the identified one or more credentials. The method further includes determining that the first credential is shared, based at least in part, on the analysis of the frequency of usage of the first credential in authentication events by one or more hosts, and information related to authentication events corresponding to the one or more hosts that utilize the credential in authentication events. The method further includes generating a report that identifies that the first credential is shared.

20 Claims, 4 Drawing Sheets

(56) References Cited

U.S. PATENT DOCUMENTS

| | | | | |
|---|---|---|---|---|
| 2005/0249341 | A1* | 11/2005 | Mahone | G06F 21/55 |
| | | | | 379/114.14 |
| 2006/0045245 | A1* | 3/2006 | Aaron | H04M 15/73 |
| | | | | 379/111 |
| 2009/0049555 | A1 | 2/2009 | Cho et al. | |
| 2011/0296001 | A1 | 12/2011 | Ramstrom | |
| 2014/0325646 | A1* | 10/2014 | Turgeman | G06F 21/316 |
| | | | | 726/22 |
| 2016/0306965 | A1* | 10/2016 | Iyer | G06F 21/552 |
| 2017/0098219 | A1* | 4/2017 | Peram | G06Q 30/0225 |

OTHER PUBLICATIONS

"Discovery & Audit, The Challenge", CyberArk Software DNA, 2 pages, printed Jan. 25, 2016.
"Auto-Discovery System—Hitachi ID Identity Manager", Hitachi ID Systems, Inc. 2016, printed Jan. 25, 2016, 3 pages, <http://hitachi-id.com/identity-manager/technology/auto-discovery.html.>.
Patrick, Andrew S., "Monitoring Corporate Password Sharing Using Social Network Analysis", NRS Canada, Paper to be presented at the International Sunbelt Social Network Confemece, St. Pete Beach, Florida, Jan. 22-27, 2008, 9 pages.

\* cited by examiner

RETROSPECTIVE DISCOVERY OF SHARED CREDENTIALS

BACKGROUND OF THE INVENTION

The present invention relates generally to the field of computer security, and more particularly with credential management in a distributed computing environment.

Electronic "credentials" are data objects utilized within networked computer systems utilized for various security purposes, such as identification and/or authorization. Credentials are utilized by a networked computer system to authenticate human users and other computing systems, such as servers. Credentials are used to control access to data and other computing resources, such as licensed software. Access to sensitive activities, such as modifying configuration files at a system resource, is oftentimes restricted to a particular group of physical users, such as IT administrators, having root access. Such users may login as a privileged user, such as the root user, using a password dedicated to the root user account. Credentials of other users and/or computer systems can be tailored to have restricted access levels, such as read-only or read/write but not update or delete.

Organizations face increased pressure of maintaining regulatory and/or corporate policy compliance. To prove and maintain compliance, management of credential can include which users have access to an account, the purpose for which the account is used, and the auditing of the administrative activities while the account was being used. Compliance auditors will ask for proof that these activities are being retained for a certain period of time, actively monitored and acted upon if out of compliance. Thus, an organization may be required to keep track of which users access certain system resources and what activities the users are performing with respect to these system resources. Tracking the user of credential and monitoring system and security logs is one method to audit the activities of user and/or computing systems.

SUMMARY

According to aspects of the present invention, there is a method, computer program product, and/or system for identifying a shared credential within a networked computing environment. The method includes one or more computer processors accessing information corresponding to an aggregated plurality of authentication events within a networked computing environment. The method further includes one or more computer processors identifying one or more credentials that are associated with the aggregated plurality of authentication events. The method further includes one or more computer processors analyzing a frequency of usage of a first credential, wherein the first credential is included in the identified one or more credentials that are associated with the aggregated plurality of authentication events. The method further includes one or more computer processors determining that the first credential is shared, based at least in part, on the analysis of the frequency of usage of the first credential in authentication events by one or more hosts, and information related to authentication events corresponding to the one or more hosts that utilize the credential in authentication events. The method further includes one or more computer processors generating a report that identifies that the first credential is shared.

DETAILED DESCRIPTION

Figure 1:
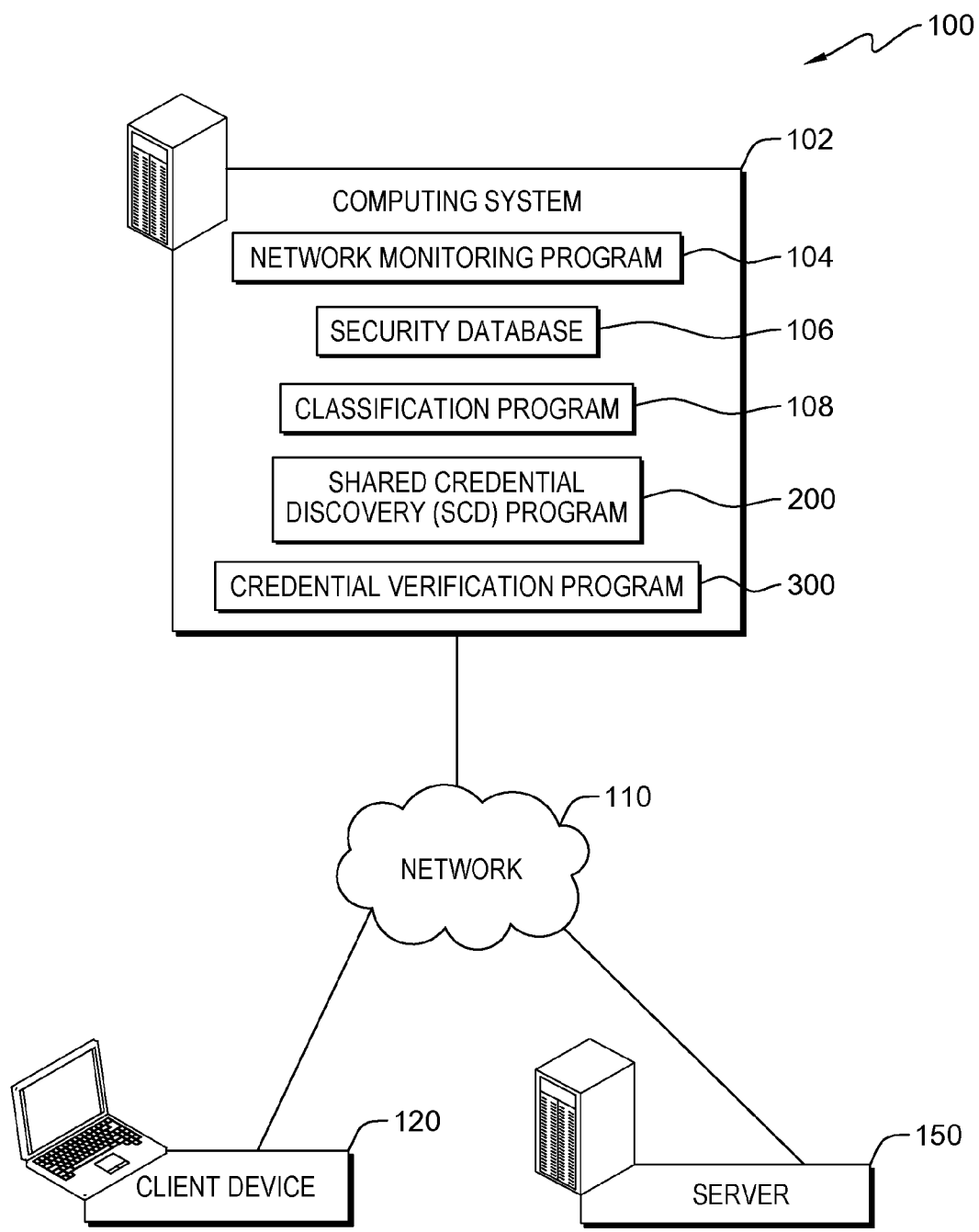
FIG. 1 illustrates a distributed computing environment, in accordance with an embodiment of the present invention.

Embodiments of the present invention recognize that it is difficult to prevent users from sharing credentials, and/or configuring programs and other computer systems from utilizing shared credentials. Once shared credentials are discovered, various security and system management facilities, such as privileged identity management (PIM) program, can control the rights of users to access shared credentials and enforce a sharing mechanism such that actions performed using the shared credentials can be tracked back to the real user. However, in legacy systems and systems where credentials are utilized by multiple shared users, determining whether a credential is shared or not shared may be difficult. Many organizations have multiple systems and each system may dictate and/or utilize different credentials for each account. Accounts can be associated with system administrators/super-users, programming scripts, application accounts, system accounts, individual accounts, and accounts associated with shared mobile devices (e.g., tablet computers). A high volume of privileged accounts, however, represents a security vulnerability to an organization. A PIM program can be used as an information security and governance tool to help companies in meeting compliance regulations and to prevent internal data breaches through the use of privileged accounts. However, knowledge of which accounts (e.g., IDs) and/or credentials are shared is a prerequisite to use PIM.

Embodiments of the present invention analyze authentication events within a networked computing environment to determine whether a credential is shared or not shared. Embodiments of the present invention analyze a combination of: usage distributions over time for a credential, which host(s) one or more hosts transmit the credential, which hosts(s) one or more hosts receive the credential, and a classification for each host associated with the credential. Embodiments of the present invention may obtain authentication event information from a network monitoring program that monitors network traffic at routers within a networked computing environment for authentication protocols. Some embodiments of the present invention utilize authentication information associated with unencrypted network traffic. Other embodiments of the present invention obtain addition information for encrypted network traffic based on the availability of decryption keys.

One embodiment of the present invention utilizes one or more classification programs and/or statistical analysis techniques to determine usage distributions for a credential for a period of time. For example, a usage of a credential is determined every 24 hours, a distribution analysis of the usage of the credential occurs at 7-day intervals, and the distributions are classified with respect to low-usage, medium-usage, and high-usage criteria. Another embodiment of the present invention may utilize one or more classification programs to determine a classification, such as personal workstation or server for each host and/or ID that communicates with a server for a host not previously identified within the networked computing environment.

Embodiments of the present invention may utilize the classification of a host to select the direction of network activity (e.g., incoming and/or outgoing) that is utilized for determining usage distributions for a credential.

Embodiments of the present invention generate reports that identify shared credentials. Subsequently, the reports are verified by an administrator of the networked computing environment. In addition, embodiments of the present invention may also identify the privileges granted to a credential and/or an ID (e.g., human user, host name, etc.) that utilizes the credential. In such embodiments, for example, an administrator of a networked computing environment and/or a security function, such as a PIM, may utilize the reports and privilege information of a credential for a compliance audit. Further embodiments of the present invention may utilize the verified reports to provide feedback to one or more classification programs utilized by the present invention to perform machine learning to improve the accuracy of classifications.

The present invention will now be described in detail with reference to the Figures. FIG. 1 is a functional block diagram illustrating networked computing environment 100 in an embodiment, in accordance with the present invention. In an embodiment, networked computing environment 100 includes: computing system 102, client device 120, and server 150, all interconnected over network 110. Many modifications to the depicted environment may be made by those skilled in the art without departing from the scope of the invention as recited by the claims. In various embodiments and examples, client device 120, server 150, and other computing systems/devices herein may be referred to as "hosts." A host that initiates an authentication event is a client-host. A host that receives an authentication request is a target-host.

Computing system 102, client device 120, and server 150 may be: laptop computers, tablet computers, netbook computers, personal computers (PC), desktop computers, personal digital assistants (PDA), smart phones, wearable devices (e.g., digital eyeglasses, smart glasses, smart watches, etc.), or any programmable computer systems known in the art. In certain embodiments, computing system 102, client device 120, and server 150 represent computer systems utilizing clustered computers and components (e.g., database server computers, application server computers, etc.) that act as a single pool of seamless resources when accessed through network 110, as is common in data centers and with cloud-computing applications. In general, computing system 102, client device 120, and server 150 are representative of any programmable electronic device or combination of programmable electronic devices capable of executing machine-readable program instructions and communicating with users of computing system 102, client device 120, and server 150, via network 110. Computing system 102, client device 120, and server 150 may include components, as depicted and described in further detail with respect to FIG. 4, in accordance with embodiments of the present invention.

Computing system 102 includes: network monitoring program 104, security database 106, classification program 108, shared credential discovery (SCD) program 200, and credential verification program 300. In an embodiment, computing system 102 may also include various programs and/or databases, such as but not limited to: a PIM, a firewall program, a domain name/address database, etc. (not shown).

Network monitoring program 104 is a program that collects authentication events between computing systems that communicate via network 110, such as client device 120 and server 150. In one embodiment, network monitoring program 104 is an integrated suite of programs, such as a security information and event management (SIEM) program. In various embodiments, network monitoring program 104 stores (i.e., aggregates) information associated with authentication events in security database 106. Network monitoring program 104 stores communication/authentication information related to an authentication event such as, but not limited to: a timestamp, a client-host (e.g., host name, IP address, etc.), a target-host, a user ID, a credential and associated privileges. In some embodiments, network monitoring program 104 determines whether an authentication event is initiated by a host (i.e., outgoing), or whether an authentication event is received by a host (i.e., incoming). In another embodiment, network monitoring program 104 may store authentication events within one or more audit logs. In some embodiments, network monitoring program 104 may not identify information associated with encrypted authentication events if decryption keys are not accessible by network monitoring program 104.

Security database 106 includes information related to controlling access (e.g., authentication) to various hardware resources within networked computing environment 100, such as client device 120 and server 150; and/or software resources, such as databases, files, and computer programs that reside and/or execute on hardware accessible via network 110. In an embodiment, security database 106 includes one or more audit logs, files, and/or databases of authentication events collected by network monitoring program 104. In some embodiments, security database 106 includes a database comprised of information related to IDs corresponding to entities (e.g., human users, servers, computing resources, IP addresses, etc.), one or more credentials assigned to an entity/ID, privileges associated with each credential, etc. In another embodiment, security database 106 stores the credential utilization reports generated by SCD program 200. In various embodiments, the credential utilization reports stored within security database 106 may be modified by credential verification program 300. In an embodiment, security database 106 includes one or more sampling plans and/or system administrator controls that dictate the frequency (i.e., rate) and/or duration of a monitoring period utilized by one or more programs, such as classification program 108, etc. In an example, security database 106 may include a tiered sampling plan/monitoring frequency dictates, such as a 7-day period for determining the usage of credentials, and a monthly frequency for analyzing the distributions of credential usages. However, during an audit, the period associated with determining the usage of credentials increases to 4 times/day, and the frequency of analyzing the distributions of credential usages increases to weekly.

Classification program 108 is a program that can utilize multiple variables and classify one or more variables into two or more distributions or groups. In an embodiment, classification program 108 analyzes information associated with a plurality of authentication events that are aggregated over time. Examples of classification program 108 may include: an artificial neural network (ANN), a naïve Bayes classifier, a decision tree, a support vector machine. In another embodiment, classification program 108 may be a suite of statistical/mathematical functions and/or programs that analyzes the aggregated information associated with authentication events. In one example, classification program 108 performs statistical analysis on aggregated authentication within security database 106 to determine a frequency of usage for a credential during an identified period of time. In another example, classification program 108 performs mathematical analysis on aggregated authentication within security database 106 to determine a usage value (e.g., a number of authentication events) for a credential on a periodic basis, such as once per 24 hours. In various embodiments, classification program 108 may identify a host and/or credential with respect to a probability or confidence level as opposed to a binary (e.g., shared/not shared) result. In one example, classification program 108 may determine that the probability that a host is a server is 80%. In another example, classification program 108 may determine that a credential is shared based on a 95% confidence level.

In one embodiment, classification program 108 may utilize information obtained from network monitoring program 104 as network monitoring program 104 executes. In another embodiment, classification program 108 obtains authentication event information from security database 106. In some embodiments, classification program 108 may analyze authentication information on a periodic basis (e.g., a monitoring period). In an example, classification program 108 queries security database 106 to determine a monitoring period (e.g., weekly) utilized for determining usage information (e.g., frequency of usage of a credential, distributions of credential usage frequencies) associated with one or more credentials. In other embodiments, classification program 108 may analyze authentication information based on one or more rules that dictate a monitoring period. In one example, classification program 108 analyzes the authentication events associated with a virtual machine (VM) while the VM is provisioned and executing to determine a usage frequency for a credential. In addition, classification program 108 determines usage frequency distributions for the credential after each tenth provisioning of the VM. In another example, classification program 108 analyzes the authentication events and/or host classifications based on a dictate from an administrator of networked computing environment 100.

In a further embodiment, classification program 108 may undergo machine learning in response to a system administrator verifying of one or more utilization reports subsequently discussed with respect to SCD program 200 and credential verification program 300. Classification program 108 utilizes machine learning to improve classification analysis.

Shared credential discovery (SCD) program 200 is a program that analyzes authentication events that occur among computing systems and/or devices that utilize network 110 to identify shared credentials. In one embodiment, SCD program 200 executes on a periodic basis to identify one or more shared credentials. In addition, SCD program 200 generates one or more utilization reports relate to the one or more credentials identified as shared credentials. In some embodiments, SCD program 200 generates one or more utilization reports that include information associated with both shared and unshared credentials for a monitoring period. In another embodiment, SCD program 200 executes based on one or more rules and/or dictates by an administrator of networked computing environment 100. In an example, SCD program 200 executes in response to an administrator of networked computing environment 100 performing a compliance audit. In various embodiments, SCD program 200 may be dictated (e.g., assigned) a specific period of time for analyzing authentication activity, such as week 30 through week 40 of the current year.

Credential verification program 300 is a program that utilizes one or more utilization reports of SCD program 200 and communicates with an administrator of networked computing environment 100 to verify the information associated with one or more credentials that are identified as shared credentials. In some embodiments, credential verification program 300 identifies information associated with one or more granted privileges. In one scenario, credential verification program 300 identifies privileges granted to a credential. In another scenario, credential verification program 300 identifies privileges granted to an entity (e.g., a user, an ID, a server, etc.). In other embodiments, credential verification program 300 utilizes verified information from a system administrator to perform machine learning to one or more classification programs, such as classification program 108.

In one embodiment, client device 120 communicates through network 110 to server 150. In another embodiment, client device 120 communicates with one or more other computing systems and/or computing resources, such as a web server, an e-mail server, etc. (not shown) via network 110. In various embodiments, computing system 102 monitors activity and authentication events among computing systems, such as server 150 and with one or more other computing systems and/or computing resources, such as a web server, a database, a storage area network (not shown), etc. that communicate via network 110.

Network 110 can be, for example, a local area network (LAN), a telecommunications network, a wireless local area network (WLAN), such as an intranet, a wide area network (WAN), such as the Internet, or any combination of the previous and can include wired, wireless, or fiber optic connections. In general, network 110 can be any combination of connections and protocols that will support communications between client device 120, computing system 102, and server 150, in accordance with embodiments of the present invention. In various embodiments, network 110 operates locally via wired, wireless, or optical connections and can be any combination of connections and protocols (e.g., personal area network (PAN), near field communication (NFC), laser, infrared, ultrasonic, etc.).

In an embodiment, client device 120 is a computing device of a human user (e.g., a personal workstation). Client device 120 may include: user interface (UI) and various programs and electronic documents (not shown). Examples of types of programs that client device 120 can include are: a web browser, a file manager, and an office productivity suite of programs (e.g., a word processor, a graphic program, a presentation program, an e-mail program, etc.). Some programs of client device 120 may utilize credentials to authenticate to one or more other computing devices, such as server 150 within networked computing environment 100 via network 110.

In an embodiment, server 150 can include various webpages, programs, and databases (not shown). In some embodiments, server 150 is a VM executing within another computing system. In other embodiments, server 150 may act as gateway or interface for a user of client device 120 and/or another computing system (not shown) to communicate with other computing resources (e.g., a network-attached storage system) accessible via network 110. In an alternative embodiment, server 150 may be an automated computing device that communicates with networked computing environment 100, such as a remote weather station or a computer associated with a piece of equipment.

Figure 2:
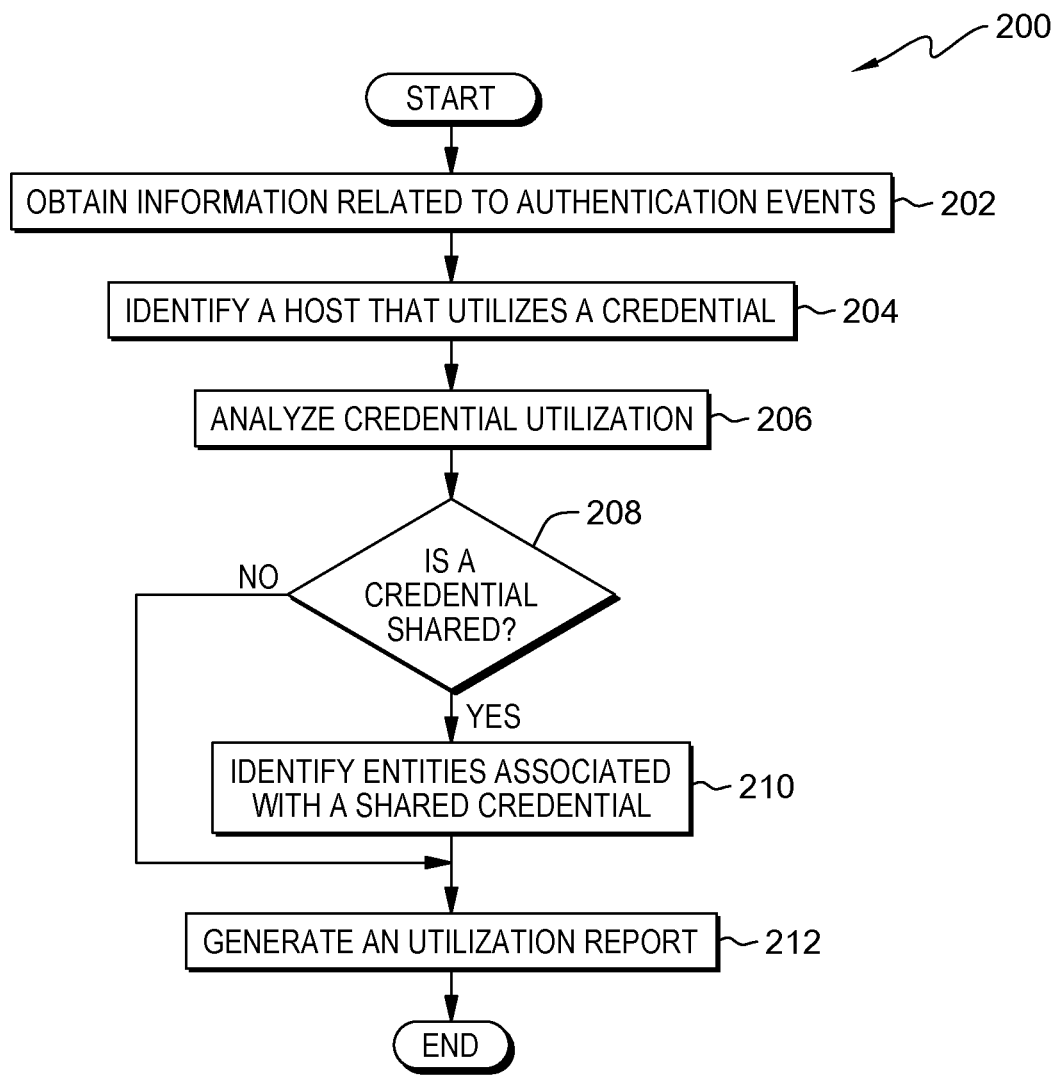
FIG. 2 depicts a flowchart of the operational steps of a shared credential discovery program, in accordance with an embodiment of the present invention.

FIG. 2 is a flowchart depicting operational steps for SCD program 200, a program that analyzes authentication events occur among computing systems and/or devices within a networked computing environment to identify credentials that are shared, in accordance with embodiments of the present invention. In some embodiments, SCD program 200 executes on a periodic basis. In other embodiments, SCD program 200 executes in response to one or more rules and/or dictates by an administrator of networked computing environment 100.

In step 202, SCD program 200 obtains information related to authentication events. In one embodiment, SCD program 200 obtains information related to authentication events from one or more log files generated by network monitoring program 104. In another embodiment, SCD program 200 obtains information related to authentication events that are stored in security database 106. In various embodiments, SCD program 200 obtains information related to authentication events, such as but not limited to: time stamps, client-hosts (e.g., host names, IP addresses, etc.), target-hosts, user IDs, credentials corresponding to the authentication events, etc.

In step 204, SCD program 200 identifies a host that utilizes a credential. In one embodiment, SCD program 200 identifies a host that utilizes a credential based on the host that initiates (e.g., a client-host) an authentication event. In another embodiment, SCD program 200 identifies a user associated with a host that utilizes a credential. In some embodiments, SCD program 200 utilizes information collected by network monitoring program 104 to identify a host that is associated with a credential that is communicated (e.g., forwarded) by a server to another computing system. In various embodiments, SCD program 200 also identifies a target-host that receives a credential.

In step 206, SCD program 200 analyzes credential utilization. In one embodiment, SCD program 200 executes an instance of classification program 108 to determine whether a computing device is a personal computing device (e.g., a workstation of a human user) or a server (e.g., an automated computing device). In another embodiment, SCD program 200 executes another instance of classification program 108 to analyze (e.g., preprocesses) an aggregation of authentication event information, and classification program 108 determines two or more distributions of usage associated with a credential, based on a classification associated with an authentication event. In an example, SCD program 200 may dictate that classification program 108 analyzes credential utilization with respect to two dimensions: the direction, that is, incoming to a host and outgoing from a host; and the usage levels, such as low, medium, and high.

In some embodiment, SCD program 200 may further refine and/or constrain one or more parameters utilized by classification program 108. In one scenario, SCD program 200 constrains classification program 108 to determine utilization distributions (e.g., usage categories) of a credential based on outgoing frequency usages of the credential for a computing device that is classified as a personal computing device (e.g., a workstation). In another scenario, SCD program 200 dictates that classification program 108 determines utilization distributions of a credential based on both outgoing frequency usages of the credential and incoming frequency usages of the credential for a computing device classified as a server. In this scenario, SCD program 200 captures credential utilization that is associated with external user registries.

SCD program 200 executes (in step 206) yet another instance of classification program 108 that utilizes the outputs of the previous instances of classification program 108 and the entities (e.g., users, IDs, systems, etc.) that utilize a credential to determine whether the credential is shared. In some scenarios, SCD program 200 includes a user ID that utilizes a host to augment the information that the other instance of classification program 108 utilizes to determine whether a credential is shared. In one example, SCD program 200 identifies a user ID that utilizes a personal device (e.g., a client-host) that communicates one credential to a server (e.g., a target-host), and that the utilization (i.e., usage) frequency is determined to be high by an instance of classification program 108. SCD program 200 determines that these indications correlate to a status of not shared for the credential. In another example, SCD program 200 identifies two or more user IDs that communicate an outgoing credential from multiple client-hosts to one target-host. In addition, SCD program 200 determines from an output of an instance of classification program 108 that the utilization distribution of the credential is low for a single client-host; however, a total frequency of utilization of the credential is high. In this example, SCD program 200 determines that these indications correlate to a status of shared for the credential. In yet another example, SCD program 200 determines that a credential is communicated between servers and that the combination of outgoing distributions associated with two or more client-hosts is similar to the incoming distribution of the credential to a target-host. SCD program 200 determines that the credential is shared and that the credential may be a functional ID associated with a program executing on the two or more client-hosts.

In decision step 208, SCD program 200 determines whether a credential is shared. In some embodiments, SCD program 200 determines whether a credential is shared based on correlation and confidence level associated with an analysis. In other embodiments, SCD program 200 may bias the determination that a credential is shared based on one or more privileges associated with the credential and/or the sensitivity (e.g., a security vulnerability) of a resource accessed using the credential. For example, SCD program 200 may designate (e.g., utilize a cautionary bias) a status of shared to a credential that provides root access to a server if classification program 108 does not determine a status of not shared to at least a 75% confidence level.

In one embodiment, SCD program 200 determines that a credential is shared by executing yet another instance of classification program 108 that utilizes the outputs of the previous instances of classification program 108 and the corresponding entities (e.g., users, IDs, systems, IP addresses, etc.) that utilize the credential to determine whether the credential is shared. In some scenarios, SCD program 200 includes the ID (e.g., a name) of the host to augment the information that the other instance of classification program 108 utilizes to determine whether a credential is shared. In one example, SCD program 200 identifies an outgoing credential that originates from multiple client-hosts classified as personal devices, and the credential is communicated to one target-host. In addition, SCD program 200 determines from an output of an instance of classification program 108 that the distribution of utilization frequencies of the credential is variable (e.g., 65% low usage, 25% medium usage, and 10% high usage) within a monitoring period. SCD program 200 determines that these indications correlate to a status of shared for the credential. In another example, SCD program 200 identifies an outgoing credential that has a low utilization frequency distribution at one or more client hosts and has a high incoming utilization frequency distribution by one server. SCD program 200 determines that these indications correlate to a status of shared for the credential. Responsive to a determination that a credential is shared (Yes branch, decision step 208), SCD program 200 identifies entities associated with a shared credential (step 210).

In step 210, SCD program 200 identifies entities that are associated with a shared credential. In one embodiment, SCD program 200 identifies one or more hosts that communicate a shared credential. In another embodiment, SCD program 200 identifies one or more IDs (e.g., users) that utilize a shared credential. In some embodiments, SCD program 200 utilizes one or more log files generated by network monitoring program 104 and/or authentication event information stored in security database 106 to identify a user that utilized a host that communicated a shared credential. In other embodiments, SCD program 200 utilizes authentication event information stored in security database 106 to determine one or more client-hosts (e.g., client device 120, server 150) that utilized a target-host that is authenticated using a shared credential.

In step 212, SCD program 200 generates a utilization report. In one embodiment, SCD program 200 generates a report based on the utilization of one or more credentials that are identified as shared. In another embodiment, SCD program 200 generates a report based on the utilization of one or more credentials that are identified as not shared. In some embodiments, SCD program 200 includes the names of entities, the user IDs, etc. that are associated with a shared credential in a generated report. In other embodiments, SCD program 200 may include: a list of authentication events, a distribution of usage, a classification analysis (e.g., a confidence level), etc. associated with a shared credential. In further embodiments, SCD program 200 may include addition information in a report such as, but not limited to: charts, graphs, hyperlinks to other programs and/or resources, spreadsheets, etc. that are associated with one or more analyzed credentials.

Referring to decision step 208, in some embodiments, SCD program 200 determines that a credential is not shared. In one example, SCD program 200 identifies a personal device (e.g., a client-host) that communicates a credential, such as an e-mail system authentication, to a server (e.g., a target-host), and classification program 108 determines that the utilization frequency is high. SCD program 200 determines that these indications correlate to a status of not shared for the credential. Responsive to a determination that a credential is not shared (No branch, decision step 208), SCD program 200 generates a utilization report. In various embodiments, SCD program 200 may generate a report that includes utilization information associated with shared and not shared credentials. In other embodiments, SCD program 200 may generate one or more separate utilization reports for shared and not shared credentials.

Figure 3:
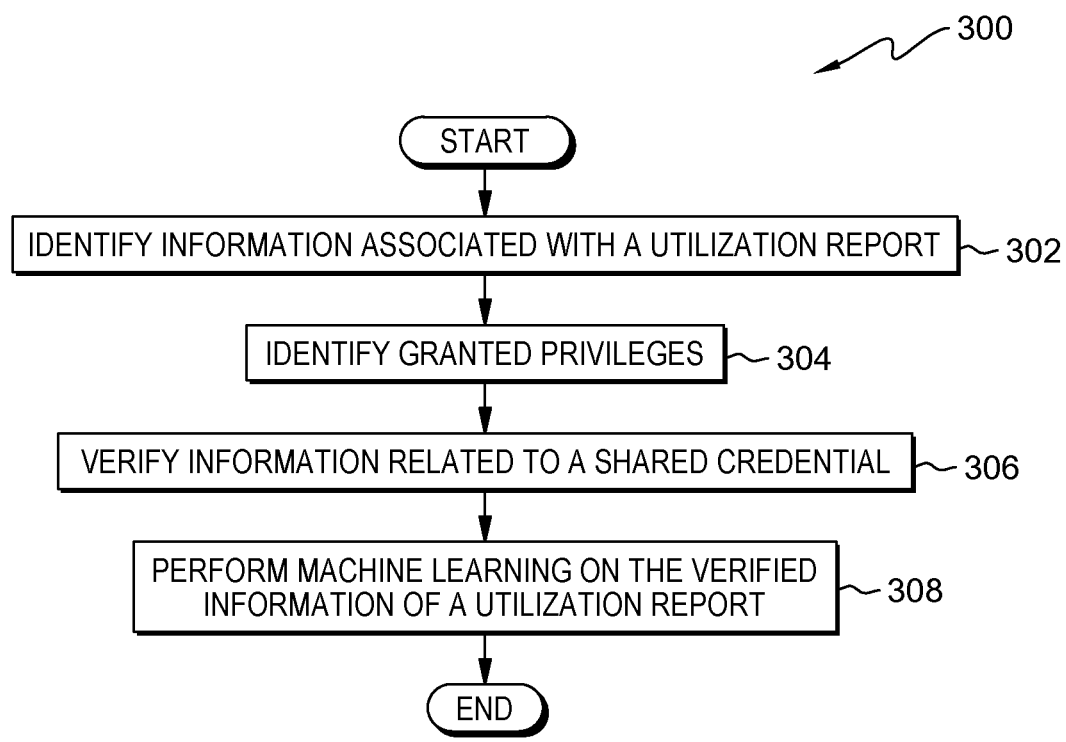
FIG. 3 depicts a flowchart of the operational steps of a credential verification program, in accordance with an embodiment of the present invention.

FIG. 3 is a flowchart depicting operational steps for credential verification program 300, a program for verifying a determination that one or more credentials is shared, in accordance with embodiments of the present invention. In addition, credential verification program 300 utilizes verification information to train (e.g., improve the accuracy of) one or more programs that are associated with classification program 108.

In step 302, credential verification program 300 identifies information associated with a utilization report. In an embodiment, credential verification program 300 identifies information that identifies one or more shared credentials. For example, information that credential verification program 300 may utilize includes, but is not limited to: identities of entities (e.g., user IDs, host names, IP addresses, etc.); credential information and usage, such as usage distributions; systems and/or resources (e.g., executable programs, databases, files, etc.) that authenticate via a shared credential, etc.

In step 304, credential verification program 300 identifies privileges granted to an entity. In an embodiment, credential verification program 300 utilizes security database 106 to identify one or more privileges granted to an entity that is associated with a shared credential. In a further embodiment, credential verification program 300 may utilize a SIEM program to cross-reference which privileges are granted to an entity as opposed to the privileges associated with the shared credential. In various embodiments, if credential verification program 300 can identify an entity (e.g., client device 120), then credential verification program 300 may further trace the credential to a user ID. In an example, credential verification program 300 may utilize a SIEM program to cross-reference which privileges are granted to the user as opposed to which privileges associated with the shared credential.

In step 306, credential verification program 300 verifies information related to a shared credential. In one embodiment, credential verification program 300 receives information from an administrator of networked computing environment 100 that indicates which credentials are verified as shared among credentials that are identified as shared. In addition, credential verification program 300 may obtain additional information from a network administrator as to the shared credentials that are utilized by human users as opposed to the shared credentials that are utilized by computing systems, such as server 150. In another embodiment, credential verification program 300 receives information from an administrator of networked computing environment 100 that indicates which host(s) that utilize a shared credential correspond to a device (e.g., a workstation) of a human user, such as client device 120. In some embodiments, credential verification program 300 obtains information from an administrator of networked computing environment 100 that one or more credentials identified as shared are not shared (e.g., a false-positive).

In step 308, credential verification program 300 performs machine learning on the verified information of a utilization report. In one embodiment, credential verification program 300 communicates the verified information associated with a utilization report to classification program 108. Credential verification program 300 initiates machine learning, such as predictive analytics for classification program 108 to improve the accuracy of classification program 108 to identify a host as a computing device of a user (e.g., client device 120) as opposed to a server (e.g., server 150) based on the verified utilization report. In an example, credential verification program 300 initiates machine learning that which identifies a new correlation (e.g., a set of conditions) that classification program 108 utilizes to determine a status of shared for a credential.

In an alternative embodiment, credential verification program 300 interfaces with one or more security programs associated with network monitoring program 104 to train the one or more security programs to identify (e.g., predict) which host and/or user may utilize a credential as a shared credential in the future. In an example, credential verification program 300 may communicate a verified utilization report to a SIEM program which utilizes machine learning to identify hosts that may need additional security measures implemented in response to debug activity, since the debug activity utilizes an increased number of shared credentials.

Figure 4:
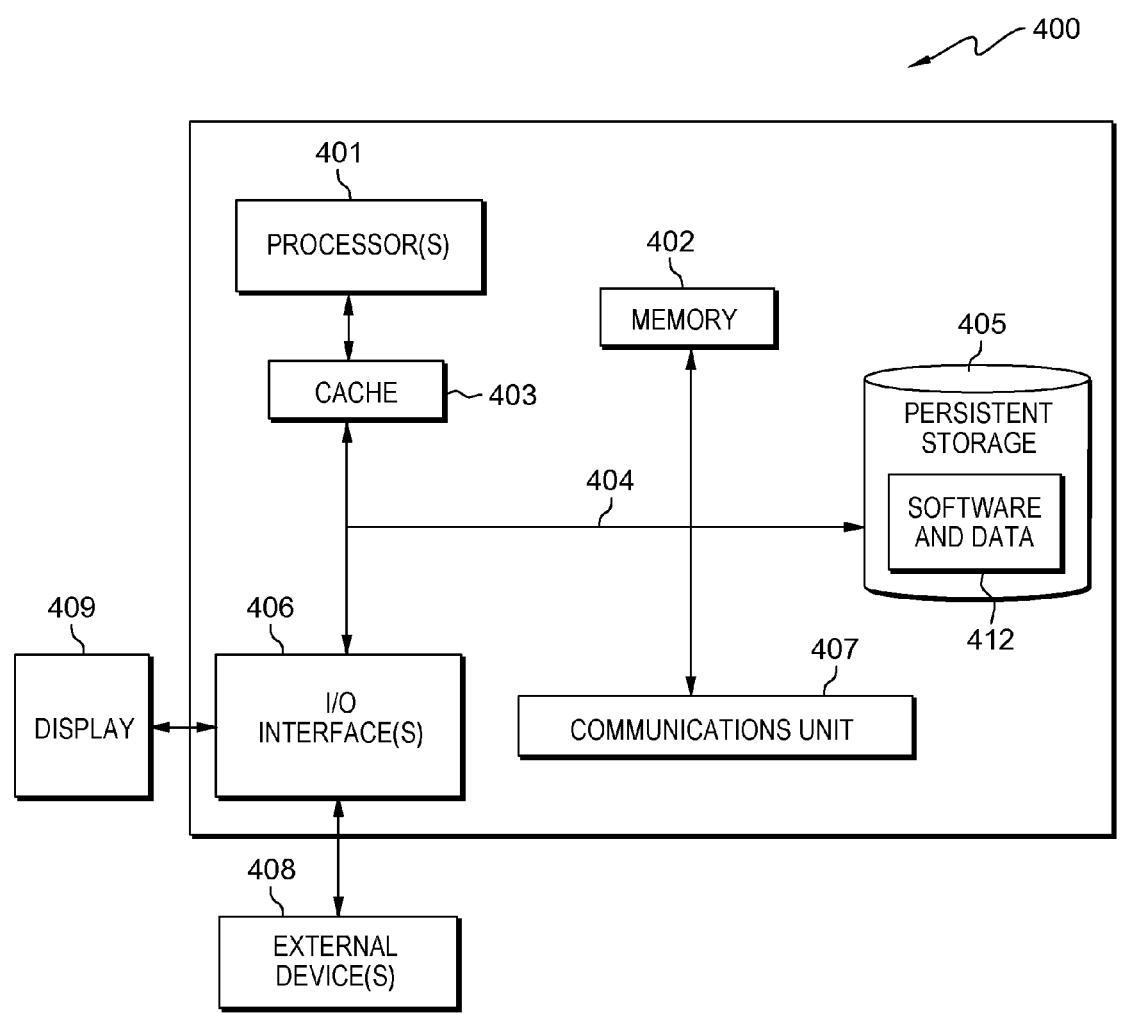
FIG. 4 is a block diagram of components of a computer, in accordance with an embodiment of the present invention.

FIG. 4 depicts computer system 400, which is representative of computing system 102, client device 120, and server 150. Computer system 400 is an example of a system that includes software and data 412. Computer system 400 includes processor(s) 401, memory 402, cache 403, persistent storage 405, communications unit 407, I/O interface(s) 406, and communications fabric 404. Communications fabric 404 provides communications between memory 402, cache 403, persistent storage 405, communications unit 407, and I/O interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 are stored in persistent storage 405 for access and/or execution by one or more of the respective processor(s) 401 via cache 403 and one or more memories of memory 402. With respect to computing system 102, software and data 412 includes: network monitoring program 104, security database 106, classification program 108, SCD program 200, credential verification program 300, and various programs (not shown).

Communications unit 407, in these examples, provides for communications with other data processing systems or devices, including resources of computing system 102, client device 120, and server 150. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Software and data 412 used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor. Display 409 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, a list of alternatives such as "at least one of A, B, and C" should be interpreted to mean "at least one A, at least one B, at least one C, or any combination of A, B, and C."

Additionally, the phrase "based on" should be interpreted to mean "based, at least in part, on."

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for identifying a shared credential within a networked computing environment, the method comprising:

accessing, by one or more processors, information corresponding to an aggregated plurality of authentication events within a networked computing environment;

identifying, by one or more processors, one or more credentials that are associated with the aggregated plurality of authentication events;

analyzing, by one or more processors, a frequency of usage of a first credential, wherein the first credential is included in the identified one or more credentials that are associated with the aggregated plurality of authentication events;

determining, by one or more processors, that the first credential is shared, based at least in part, on the analysis of the frequency of usage of the first credential in authentication events by one or more hosts, and information related to authentication events corresponding to the one or more hosts that utilize the credential in authentication events;

generating, by one or more processors, a report that identifies that the first credential is shared, wherein the report includes information corresponding to: identities of one or more entities that utilize the first credential, one or more systems that authenticate via the first credential, and one or more computer programs authenticate via the first credential;

determining, by one or more computer processors, information related to the privileges of the first credential, and the respective privileges granted to the one or more entities that utilize the first credential, the one or more systems that authenticate via the first credential, and the one or more computer programs that authenticate via the first credential;

initiating, by one or more computer processors, a compliance audit based on information of the generated report, the determined information of respective privileges, and information indicating, which entities, systems, and computer programs that can utilize the first credential as a shared credential; and updating, in response to determining that a first entity engages in one or more activities associated with utilizing one or more shared credentials, by one or more computer processors, one or more security measures implemented on a first host prior to the first entity utilizing a second credential.

2. The method of claim 1, further comprising:

determining, by one or more processors, the frequency of usage of the first credential, wherein the frequency of usage of the first credential is the number of uses of the first credential within a monitoring period.

3. The method of claim 1, wherein analyzing the frequency of usage of the first credential further comprises:

determining, by one or more processors, a classification for each host that utilizes the first credential;

for each host that utilizes the first credential, determining, by one or more processors, a number of uses of the first credential within the monitoring period, based on a classification of each host; and determining, by one or more processors, two or more distributions of the frequency of uses for the first credential, wherein the two or more distributions of uses for the first credential are based, at least in part on, a classification that corresponds to each host that utilizes the first credential, and information corresponding to the authentication event associated with each host utilizing the first credential.

4. The method of claim 3, wherein each host that utilizes the first credential is classified utilizing a classification program, the classification based, at least in part, on an analysis of a plurality of hosts within the networked computing environment, and wherein the classification program is trained based on a set of known hosts within the networked computing environment.

5. The method of claim 1, wherein analyzing the frequency of usage of the first credential occurs on a periodic basis, and wherein information corresponding to the plurality of authentication events includes: an indication of a credential, an indication of a client-host, an indication of a target-host, and an ID for an entity that initiates the authentication event.

6. The method of claim 5, wherein the client-host is associated with an outgoing credential, and wherein the target-host is associated with an incoming credential.

7. The method of claim 1, further comprising:

in response to determining that the first entity utilized the first credential as the shared credential, indicating that the first entity is an entity that utilized at least one shared credential;

identifying, by one or more computer processors, the first host, the first host being associated with the first entity; and identifying, by one or more computer processors, one or more activities associated with utilizing one or more shared credentials.

8. A computer program product for identifying a shared credential within a networked computing environment, the computer program product comprising:

one or more computer readable storage media and program instructions stored on the one or more computer readable storage media, the program instructions readable/executable by one or more computer processors:

program instructions to access information corresponding to an aggregated plurality of authentication events within a networked computing environment;

program instructions to identify one or more credentials that are associated with the aggregated plurality of authentication events;

program instructions to analyze a frequency of usage of a first credential, wherein the first credential is included in the identified one or more credentials that are associated with the aggregated plurality of authentication events;

program instructions to determine that the first credential is shared, based at least in part, on the analysis of the frequency of usage of the first credential in authentication events by one or more hosts, and information related to authentication events corresponding to the one or more hosts that utilize the credential in authentication events;

program instructions to generate a report that identifies that the first credential is shared, wherein the report includes information corresponding to: identities of one or more entities that utilize the first credential, one or more systems that authenticate via the first credential, and one or more computer programs authenticate via the first credential;

program instructions to determine information related to the privileges of the first credential, and the respective privileges granted to the one or more entities that utilize the first credential, the one or more systems that authenticate via the first credential, and the one or more computer programs that authenticate via the first credential;

program instruction to initiate a compliance audit based on information of the generated report, the determined information of respective privileges, and information indicating, which entities, systems, and computer programs can utilize the first credential as a shared credential; and program instructions to respond to determining that a first entity engages in one or more activities associated with utilizing one or more shared credentials by updating one or more security measures implemented on a first host prior to the first entity utilizing a second credential.

9. The computer program product of claim 8, further comprising:

program instructions to determine the frequency of usage of the first credential, wherein the frequency of usage of the first credential is the number of uses of the first credential within a monitoring period.

10. The computer program product of claim 8, wherein program instructions to analyze the frequency of usage of the first credential further comprises:

program instructions to determine a classification for each host that utilizes the first credential;

for each host that utilizes the first credential, program instructions to determine a number of uses of the first credential within the monitoring period, based on a classification of each host; and program instructions to determine two or more distributions of the frequency of uses for the first credential, wherein the two or more distributions of uses for the first credential are based, at least in part on, a classification that corresponds to each host that utilizes the first credential, and information corresponding to the authentication event associated with each host utilizing the first credential.

11. The computer program product of claim 10, wherein each host that utilizes the first credential is classified utilizing a classification program, the classification based, at least in part, on an analysis of a plurality of hosts within the networked computing environment, and wherein the classification program is trained based on a set of known hosts within the networked computing environment.

12. The computer program product of claim 8, wherein analyzing the frequency of usage of the first credential occurs on a periodic basis, and wherein information corresponding to the plurality of authentication events includes: an indication of a credential, an indication of a client-host, an indication of a target-host, and an ID for an entity that initiates the authentication event.

13. The computer program product of claim 12, wherein the client-host is associated with an outgoing credential, and wherein the target-host is associated with an incoming credential.

14. The computer program product of claim 8, further comprising:
program instructions to respond to determining that the first entity utilized the first credential as the shared credential by indicating that the first entity is an entity that utilized at least one shared credential;
program instructions to identify the first host, the first host being associated with the first entity; and
program instructions to identify, one or more activities associated with utilizing one or more shared credentials.

15. A computer system for identifying a shared credential within a networked computing environment, the computer system comprising:
one or more computer processors;
one or more computer readable storage media;
program instructions stored on the computer readable storage media for reading/execution by at least one of the one or more computer processors, the program instructions further comprising:
program instructions to access information corresponding to an aggregated plurality of authentication events within a networked computing environment;
program instructions to identify one or more credentials that are associated with the aggregated plurality of authentication events;
program instructions to analyze a frequency of usage of a first credential, wherein the first credential is included in the identified one or more credentials that are associated with the aggregated plurality of authentication events;
program instructions to determine that the first credential is shared, based at least in part, on the analysis of the frequency of usage of the first credential in authentication events by one or more hosts, and information related to authentication events corresponding to the one or more hosts that utilize the credential in authentication events;
program instructions to generate a report that identifies that the first credential is shared, wherein the report includes information corresponding to: identities of one or more entities that utilize the first credential, one or more systems that authenticate via the first credential, and one or more computer programs authenticate via the first credential;
program instructions to determine information related to the privileges of the first credential, and the respective privileges granted to the one or more entities that utilize the first credential, the one or more systems that authenticate via the first credential, and the one or more computer programs that authenticate via the first credential;
program instruction to initiate a compliance audit based on information of the generated report, the determined information of respective privileges, and information indicating, which entities, systems, and computer programs can utilize the first credential as a shared credentials; and
program instructions to respond to determining that a first entity engages in one or more activities associated with utilizing one or more shared credentials by updating one or more security measures implemented on a first host prior to the first entity utilizing a second credential.

16. The computer system of claim 15, further comprising:
program instructions to determine the frequency of usage of the first credential, wherein the frequency of usage of the first credential is the number of uses of the first credential within a monitoring period.

17. The computer system of claim 15, wherein program instructions to analyze the frequency of usage of the first credential further comprises:
program instructions to determine a classification for each host that utilizes the first credential;
for each host that utilizes the first credential, program instructions to determine a number of uses of the first credential within the monitoring period, based on a classification of each host; and
program instructions to determine two or more distributions of the frequency of uses for the first credential, wherein the two or more distributions of uses for the first credential are based, at least in part on, a classification that corresponds to each host that utilizes the first credential, and information corresponding to the authentication event associated with each host utilizing the first credential.

18. The computer system of claim 17, wherein each host that utilizes the first credential is classified utilizing a classification program, the classification based, at least in part, on an analysis of a plurality of hosts within the networked computing environment, and wherein the classification program is trained based on a set of known hosts within the networked computing environment.

19. The computer system of claim 15:
wherein analyzing the frequency of usage of the first credential occurs on a periodic basis;
wherein information corresponding to the plurality of authentication events includes: an indication of a credential, an indication of a client-host, an indication of a target-host, and an ID for an entity that initiates the authentication event; and
wherein the client-host is associated with an outgoing credential, and wherein the target-host is associated with an incoming credential.

20. The computer system of claim 15, further comprising:
program instructions to respond to determining that the first entity utilized the first credential as the shared credential by indicating that the first entity is an entity that utilized at least one shared credential;
program instructions to identify the first host, the first host being associated with the first entity; and
program instructions to identify, one or more activities associated with utilizing one or more shared credentials.

* * * * *